United States Patent
Sparrow

(10) Patent No.: US 11,423,070 B2
(45) Date of Patent: *Aug. 23, 2022

(54) SYSTEM, COMPUTER PROGRAM PRODUCT AND METHOD FOR GENERATING EMBEDDINGS OF TEXTUAL AND QUANTITATIVE DATA

(71) Applicant: Market Advantage, Inc., Minneapolis, MN (US)

(72) Inventor: Robert Cary Sparrow, Minneapolis, MN (US)

(73) Assignee: MARKET ADVANTAGE, INC., Minneapolis, MN (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/908,782

(22) Filed: Jun. 23, 2020

(65) Prior Publication Data

US 2020/0320114 A1 Oct. 8, 2020

Related U.S. Application Data

(63) Continuation of application No. 16/050,790, filed on Jul. 31, 2018, now Pat. No. 10,726,058.

(51) Int. Cl.
*G06F 16/33* (2019.01)
*G06K 9/62* (2022.01)
*G06N 3/04* (2006.01)
*G06F 16/35* (2019.01)
*G06F 40/242* (2020.01)

(52) U.S. Cl.
CPC ........ *G06F 16/3347* (2019.01); *G06F 16/353* (2019.01); *G06F 40/242* (2020.01); *G06K 9/6256* (2013.01); *G06N 3/04* (2013.01)

(58) Field of Classification Search
CPC ... G06F 16/3347; G06F 16/353; G06F 40/242
See application file for complete search history.

(56) References Cited

U.S. PATENT DOCUMENTS 9,037,464 B1 5/2015 Mikolov et al.
9,740,680 B1 8/2017 Mikolov et al.
(Continued)

OTHER PUBLICATIONS

"Word2vec", Wikipedia, last updated Jul. 25, 2018, http://en.wikipedia.org/wiki/Word2vec.
(Continued)

*Primary Examiner* — Loc Tran
(74) *Attorney, Agent, or Firm* — Xsensus LLP

(57) ABSTRACT

A method, computer program product and computer system is disclosed that generates a set of distributed representation vectors from a dataset of textual and non-text data. In one method, a computer system receives a dataset, cleans the received dataset, parses the cleaned dataset to identify known classes of data, extracts data elements from the dataset based on the known classes of data, organizes the extracted data elements into one or more records, compiles a dictionary of unique data elements and associated codes from the one or more records, creates a set of training pairs using permutations of the codes that correspond to data elements within each record, and computes a distributed representation vector for each of the data elements in the dictionary using the set of training pairs.

12 Claims, 13 Drawing Sheets

(56) References Cited

U.S. PATENT DOCUMENTS

| | | | |
|---|---|---|---|
| 9,805,028 | B1 | 10/2017 | Sutskever et al. |
| 9,898,458 | B2 | 2/2018 | Cross, III et al. |
| 2012/0254333 | A1 | 10/2012 | Chandramouli et al. |
| 2016/0253434 | A1* | 9/2016 | Yu .................... G06N 7/005 707/760 |
| 2018/0204120 | A1* | 7/2018 | Rei .................... G06N 3/0445 |

OTHER PUBLICATIONS

Alberto Paccanaro et al., "Learning Distributed Representations of Concepts using Linear Relational Embedding", GCNU TR 2000-002, Gatsby Computational Neuroscience Unit University College London, Mar. 18, 2000, http://www.gatsby.ucl.ac.uk.

Omer Levy et al., "Neural Word Embedding as Implicit Matrix Factorization", Department of Computer Science Bar-Ilan University, 2014, https://papers.nips.cc/paper/5477-neural-word-embedding-as-implicit-matrix-factorization.pdf.

Ronan Collobert et al., "A Unified Architecture for Natural Language Processing: Deep Neural Networks with Multitask Learning", Proceedings of the 25th International Conference on Machine Learning, 2008.

Ronan Collobert et al., "Natural Language Processing (Almost) from Scratch", Journal of Machine Learning Research, 2493-2537, 2011.

Tomas Mikolov et al., "Distributed Representations of Words and Phrases and their Compositionality", Google Inc., 2013, https://papers.nips.cc/paper/5021-distributed-representations-of-words-and-phrases-and-their-compositionality.pdf.

Tomas Mikolov et al., "Efficient Estimation of Word Representations in Vector Space", Google Inc., Sep. 7, 2013, https://arxiv.org/pdf/1301.3781.pdf.

Tomas Mikolov et al., Linguistic Regularities in Continuous Space Word Representations, Proceedings of NAACL-HLT, pp. 746-751, Jun. 2013, https://www.aclweb.org/anthology/N13-1090.

Tomas Mikolov et al., "Recurrent Neural Network Based Language Model", ISCA, pp. 1045-1048, Sep. 2010, http://www.fit.vutbr.cz/research/groups/speech/publi/2010/mikolov_interspeech2010_IS100722.pdf.

Yoav Goldberg et al., "Word2vec Explained: Deriving Mikolov et al.'s Negative-Sampling Word-Embedding Method", Feb. 4, 2014, https://arxiv.org/pdf/1402.3722.pdf.

Yoshua Bengio et al., "A Neural Probabilistic Language Model", Journal of Machine Learning Research, Feb. 2003, pp. 1137-1155, http://www.jmlr.org/papers/volume3/bengio03a/bengio03a.pdf.

* cited by examiner

| job_id | code | element | category |
|---|---|---|---|
| fffffd98b48dded | 204 | Las Vegas-Paradise, NV MSA | location |
| fffffd98b48dded | 2050 | Desert Gaming, Inc. | company |
| fffffd98b48dded | 3320 | 114,750 | salary |
| fffffd98b48dded | 3951 | IT Manager | title |
| fffffd98b48dded | 861 | Integration | tag |
| fffffd98b48dded | 445 | Adobe Creative Cloud | tag |
| fffffd98b48dded | 473 | Application Specialist | tag |
| fffffd98b48dded | 493 | Bachelor Degree | tag |
| fffffd98b48dded | 586 | Collaborative | tag |

| element | code |
|---|---|
| Abilene, TX MSA | 1 |
| AK NONMETROPOLITAN AREA | 2 |
| Akron, OH MSA | 3 |
| AL NONMETROPOLITAN AREA | 4 |
| ... | |
| Youngstown-Warren-Boardman | 412 |
| Yuba City, CA MSA | 413 |
| Yuma, AZ MSA | 414 |
| ... | |
| A/B Testing | 435 |
| Ability To Learn | 436 |
| Accidental Death And Dismemb | 437 |
| Accountability | 438 |
| ... | |
| Multi-Tasking | 983 |
| MySQL | 984 |
| Nagios | 985 |
| ... | |
| Aarons | 2437 |
| ABB | 2438 |
| Abbott Laboratories | 2439 |
| Academy Sports + Outdoors | 2440 |
| Accenture | 2441 |
| ... | |
| Workbridge Associates | 2897 |
| WVU Healthcare | 2898 |
| Wyndham Vacation Ownership | 2899 |
| XPO Logistics | 2900 |
| ... | |
| $20,000.00 | 2941 |
| $20,250.00 | 2942 |
| $20,500.00 | 2943 |
| $20,750.00 | 2944 |
| ... | |
| Administrative Assistant | 4069 |
| Senior Software Engineer | 4070 |
| Manager, Information Technolo | 4071 |
| Director of Business Developme | 4072 |
| District Sales Manager | 4073 |
| ... | |
| Data Center Engineer | 6216 |
| Marketing Data Analyst | 6217 |
| Sr. Infrastructure Engineer | 6218 |

310 element
315 code
320, 325, 330, 335, 340

FIG. 3

| input code | output code |
|---|---|
| 204 | 445 |
| 204 | 473 |
| 204 | 493 |
| 204 | 586 |
| 204 | 861 |
| 204 | 2050 |
| 204 | 3320 |
| 204 | 3951 |
| 2050 | 204 |
| 2050 | 445 |
| 2050 | 473 |
| 2050 | 493 |
| 2050 | 586 |
| 2050 | 861 |
| 2050 | 3320 |
| 2050 | 3951 |
| 3320 | 204 |
| 3320 | 445 |
| ⋮ | ⋮ |

FIG. 4

| job_id | code | element | category |
|---|---|---|---|
| fffffd98b48ddee | 1 | Alexandria, VA | location |
| fffffd98b48ddee | 2 | Zobles, Ysinski, and Xylus, LLP | company |
| fffffd98b48ddee | 3 | 120,000 | salary |
| fffffd98b48ddee | 4 | Patent Attorney or Agent - Biotechnology | title |
| fffffd98b48ddee | 5 | hr@zyxiplaw.com | tag |
| fffffd98b48ddee | 6 | (703) 555-9876 | tag |
| fffffd98b48ddee | 7 | apply scientific principles | tag |
| fffffd98b48ddee | 8 | patent preparation | tag |
| fffffd98b48ddee | 9 | patent prosecution | tag |
| fffffd98b48ddee | 10 | inter partes matters | tag |
| fffffd98b48ddee | 11 | evaluation of patents | tag |
| fffffd98b48ddee | 12 | PhD Immunology | tag |
| fffffd98b48ddee | 13 | molecular biology | tag |
| fffffd98b48ddee | 14 | USPTO registration | tag |
| fffffd98b48ddee | 15 | 1 year of experience | tag |
| fffffd98b48ddee | 16 | writing ability | tag |

| input code | output code | input code | output code |
|---|---|---|---|
| 1 | 2 | 2 | 9 |
| 1 | 3 | 1 | 11 |
| 1 | 4 | 16 | 4 |
| 1 | 5 | 6 | 12 |
| 1 | 6 | 10 | 3 |
| 1 | 7 | 8 | 12 |
| 1 | 8 | 15 | 2 |
| 1 | 9 | 7 | 8 |
| 1 | 10 | 14 | 6 |
| 1 | 11 | 9 | 1 |
| 1 | 12 | 13 | 15 |
| 1 | 13 | 7 | 9 |
| 1 | 14 | 3 | 4 |
| 1 | 15 | 9 | 14 |
| 1 | 16 | 12 | 3 |
| 2 | 1 | 6 | 2 |
| 2 | 3 | 15 | 4 |
| 2 | 4 | 2 | 7 |
| 2 | 5 | 1 | 6 |
| 2 | 6 | 8 | 13 |
| 2 | 7 | 14 | 3 |
| 2 | 8 | 5 | 2 |
| 2 | 9 | 8 | 16 |
| 2 | 10 | 12 | 1 |
| 2 | 11 | 15 | 14 |
| 2 | 12 | 9 | 11 |
| 2 | 13 | 7 | 2 |
| 2 | 14 | 4 | 15 |
| 2 | 15 | 13 | 9 |
| 2 | 16 | 2 | 13 |
| ⋮ | ⋮ | ⋮ | ⋮ |
| 16 | 1 | 8 | 6 |
| 16 | 2 | 3 | 7 |
| 16 | 3 | 1 | 9 |
| 16 | 4 | 16 | 3 |
| 16 | 5 | 12 | 2 |
| 16 | 6 | 4 | 13 |
| 16 | 7 | 13 | 7 |
| 16 | 8 | 2 | 3 |
| 16 | 9 | 15 | 12 |
| 16 | 10 | 5 | 16 |
| 16 | 11 | 7 | 13 |
| 16 | 12 | 11 | 1 |
| 16 | 13 | 9 | 10 |
| 16 | 14 | 8 | 5 |
| 16 | 15 | 2 | 14 |

| | | | | |
|---|---|---|---|---|
| Alexandria, VA | .674 | .437 | .911 | .023 |
| Zobles, Ysinski, and Xylus, LLP | .472 | .346 | .684 | .994 |
| 120,000 | .398 | .921 | .372 | .483 |
| Patent Attorney or Agent - Biotechnology | .855 | .378 | .185 | .085 |
| hr@zyxiplaw.com | .667 | .836 | .911 | .023 |
| (703) 555-9876 | .276 | .322 | .673 | .379 |
| apply scientific principles | .354 | .023 | .003 | .437 |
| patent preparation | .972 | .684 | .731 | .832 |
| patent prosecution | .198 | .976 | .763 | .377 |
| inter partes matters | .052 | .384 | .197 | .616 |
| evaluation of patents | .381 | .196 | .683 | .684 |
| PhD Immunology | .379 | .666 | .374 | .276 |
| molecular biology | .271 | .831 | .635 | .023 |
| USPTO registration | .837 | .654 | .286 | .354 |
| 1 year of experience | .322 | .456 | .374 | .322 |
| writing ability | .664 | .199 | .438 | .198 |

SYSTEM, COMPUTER PROGRAM PRODUCT AND METHOD FOR GENERATING EMBEDDINGS OF TEXTUAL AND QUANTITATIVE DATA

CROSS-REFERENCE TO RELATED APPLICATION

The present application is a continuation of U.S. application Ser. No. 16/050,790, filed Jul. 31, 2018, the entire contents of which are incorporated herein by reference.

BACKGROUND OF THE INVENTION

Field of the Invention

The present disclosure generally relates to the field of data and natural language processing, and more particularly to systems and methods for learning embeddings of data elements such as words, phrases, sentences, quantitative, and other classes of data for determining the similarity between and among data objects containing one or more data elements.

Description of the Related Art

Natural language processing (NLP) is a multidisciplinary field involving aspects of computer science, artificial intelligence, and linguistics that, among other things, is concerned with using computers to derive meaning from, and allow operations on, natural (human) language text.

NLP systems may perform many different tasks, including, but not limited to, determining the relationship between and among text strings (words, phrases and sentences, for example). A known way to determine the relationship between and among words, phrases or sentences is to compare their respective embeddings. An embedding is a mapping of natural language text to a vector of real numbers in a vector space (called "word vectors" or "distributed representation vectors"). Embedding usually involves mapping from a vector space of high dimensionality (e.g., one dimension per word, phrase or sentence—the size of a vocabulary or dictionary) to a vector space with a much lower dimensionality. Typically, the embeddings of similar or related words, phrases or sentences are located "close" to each other in the vector space.

SUMMARY OF THE INVENTION

According to an aspect of the present disclosure, there is a method, computer program product and/or computer system that generates a set of distributed representation vectors by receiving a dataset, wherein the dataset comprises a set of related items of at least one of natural language text and non-text data; cleaning the received dataset; parsing the cleaned dataset to identify known classes of data; extracting data elements from the dataset based on the known classes of data; organizing the extracted data elements into one or more records; compiling a dictionary of unique data elements and associated codes from the one or more records; creating a set of training pairs using permutations of the codes that correspond to data elements within each record; and computing a distributed representation vector for each of the data elements in the dictionary using the set of training pairs.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an illustration of an example database record according to an embodiment of the present disclosure;

FIG. 3 is an illustration of an example dictionary according to an embodiment of the present disclosure;

FIG. 4 is an illustration of a set of training input/output pairs according to an embodiment of the present disclosure;

FIG. 10 is an illustration of another example database record according to an embodiment of the present disclosure;

FIG. 12 is an illustration of another set of training input/output pairs according to an embodiment of the present disclosure;

FIG. 14 is an illustration of another example weight matrix according to an embodiment of the present disclosure.

DETAILED DESCRIPTION OF THE PREFERRED EMBODIMENTS

Figure 1:
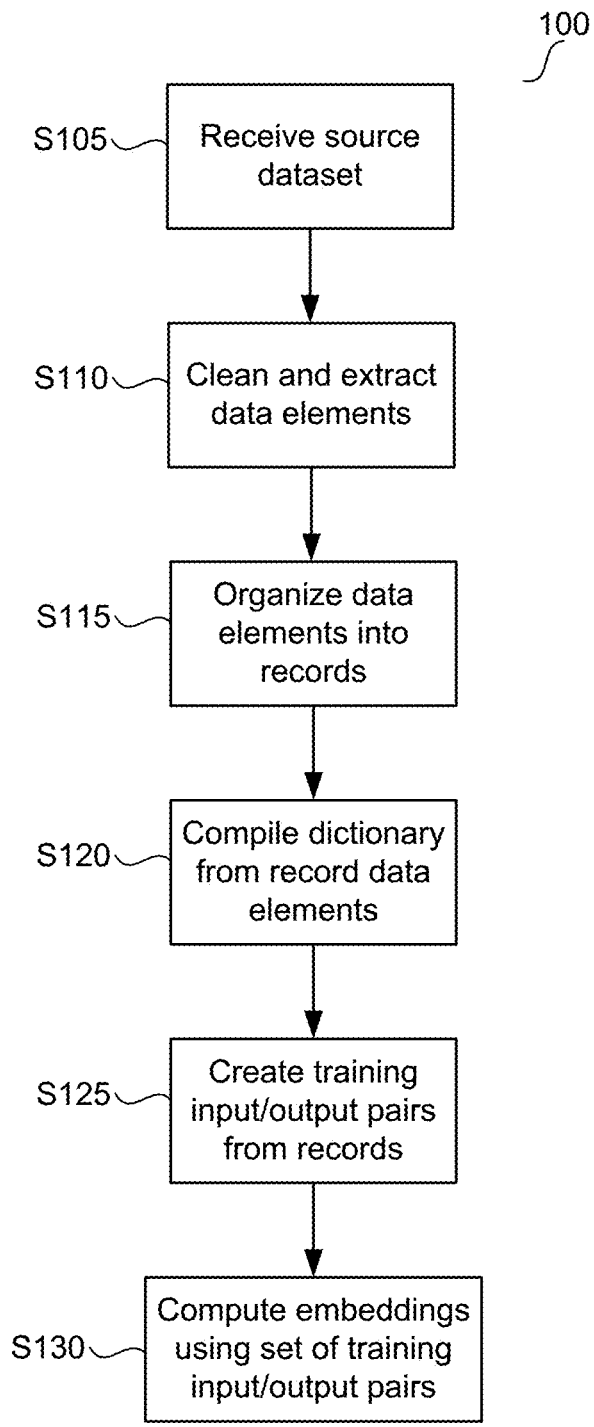
FIG. 1 is a flow diagram showing an embodiment of a process according to the present disclosure.

In a data processing system, it may be useful to represent data elements, including words, phrases and sentences found in natural language text, and non-text data such as quantitative data, dates, timestamps, computer instructions, hypertext, status flags, binary codes, geospatial data, identification codes, other alphanumeric strings, and the like, as vectors in a vector space. This may allow for the comparison of data objects containing one or more data elements by determining the proximity of their representations in the vector space. Various methods for mapping words, phrases or sentences into lower dimensional vectors (embedding) are known, but typically these methods use some form of linguistic context of the words (e.g., words in a sentence and within a short distance of each other). Embodiments in the present disclosure may implement embedding, instead, by associating all types of data, including natural language text (such as words, phrases and sentences) and, also, quantitative data (numeric information) and/or other types of non-text data (such as dates, timestamps, computer instructions, hypertext, status flags, binary codes, geospatial data, identification codes, other alphanumeric strings, or the like) that are within a common data object (e.g., a database record, or the like).

The flow diagrams and block diagrams in the figures illustrate exemplary (and in some cases, simplified) architecture, functionality, and operation of possible implementations of systems, methods, and computer program products according to various embodiments in the present disclosure. In the diagrams and the associated descriptions, each block in a flow diagram or block diagram may represent a module, segment, or group of instructions that may be used for implementing the specified function. In some alternative embodiments, the functions noted in the flow diagrams or block diagrams may occur in an order different from that illustrated in the figures without affecting overall functionality. For example, two blocks shown in succession may be executed concurrently, or the blocks may, in some embodiments, be executed in the reverse order, depending upon the functionality involved. It should also be noted that each block of the block diagrams and/or flow diagrams, and combinations of blocks in the block diagrams and/or flow diagrams, can be implemented by special purpose hardware-based systems that perform the specified functions or consist of a combination of special purpose hardware and computer instructions.

One way to determine similarity between data objects containing one or more data elements of varying types of data, including natural language text (such as words, phrases, sentences), quantitative data, and other types of non-text data (such as dates, timestamps, computer instructions, hypertext, status flags, binary codes, geospatial data, identification codes, other alphanumeric strings, or the like) in a data processing system is to compare vector representations of those data objects and their component data elements. As stated above, embodiments of the present disclosure (including the present embodiment) may generate vector representations for any data element (or combination of data elements), which can include natural language text (such as words, phrases and sentences), quantitative data, and other types of non-text data (such as dates, timestamps, computer instructions, hypertext, status flags, binary codes, geospatial data, identification codes, other alphanumeric strings, or the like) using associations within a common data object (a database record, for example).

Referring now to the drawings, wherein like reference numerals designate identical or corresponding parts throughout the several views, FIG. 1 illustrates a flow diagram depicting a process 100 according to an embodiment of the present disclosure. Processing begins at step S105, where a process 100 may receive a source dataset. The source dataset may comprise a set of related items of natural language text, quantitative data and/or other types of data. In some embodiments, the items of natural language text may include single words, phrases or sentences. In other embodiments, the items of natural language text may include entire paragraphs, groups of paragraphs or documents. Other types of data can include dates, timestamps, computer instructions, hypertext, status flags, binary codes, geospatial data, identification codes, other alphanumeric strings, and the like. Examples of such related items include, but are not limited to, job postings, résumés, web pages, product descriptions, technical articles, product reviews, personnel records, materials records, transaction logs, purchase orders, financial reports, corporate information, and recipes. In an embodiment, job posting data may be obtained from one or more web servers having job postings provided by, for example, corporations, non-profit organizations and government agencies. For example, job posting data may be obtained from job search and professional networking websites such as CareerBuilder, Glassdoor, Idealist, Indeed, LinkedIn, Monster, and the like. Job posting data may also be obtained directly from corporate, organization or government agency websites (i.e., www.usajobs.gov).

In step S110, process 100 may clean the source dataset and extract data elements. Cleaning of the source dataset may involve, for example, removing extraneous, irrelevant or inaccurate text and non-text data from the source dataset. Cleaning may also involve correcting corrupt or inaccurate data in the dataset. Cleaning may be performed automatically or interactively with appropriate data cleaning tools.

The extraction of data elements may involve, for example, parsing the source dataset to identify known classes of data based on a consistent architecture and classification taxonomy. In an embodiment, data within a job posting, for example, may be classified as "Company/Organization Name," "Job Title," "Job Location," "Salary," "Job ID," "Posting Date," and additional fields ("Tags") like job description, required education and level, required experience, and other descriptive information. In some embodiments, some of the data classes may be defined as quantitative data (having numeric quantities) or other non-text types of data. For example, classes such as "Salary" may be defined as quantitative data, classes such as "Job ID" can be alphanumeric identifiers, classes such as "Posting Date" can be timestamps, and classes such as "Job Location" can include ZIP code and geospatial data.

In step S115, process 100 may organize the extracted data elements into database records stored in a memory or other storage device (computer readable storage medium). Each database record may include one or more categorized fields. Each field may contain one or more sub-fields. Each subfield may contain a number (e.g., integer or real number), or a text string (one or more characters of alphanumeric text). Sub-fields may also contain "pointers" (e.g., a reference to another database record), Boolean values ("1" or "0") or other types of data. In an embodiment, job posting data may be organized into records similar to that illustrated in FIG. 2.

In FIG. 2, record 200 may include fields 205-213 (each field represented by a row of the array shown in FIG. 2). In an embodiment, field 205 may relate to a location of a posted job, field 206 may relate to a company/organization name associated with a posted job, field 207 may relate to a salary associated with a posted job, field 208 may relate to a job title associated with a posted job, and fields 209-213 may relate to additional data (tags) associated with a posted job. Each of the fields 205-213 within record 200 may also include subfields 215-218 (each subfield represented by a column of the array shown in FIG. 2). In an embodiment, fields 205-213 may include subfields that identify a job_id 220, a code 225, an element 230, and a category 235.

Returning again to FIG. 1, in step S120, process 100 may compile a dictionary, stored in a memory or other storage device (computer readable storage medium), of unique data elements (no two data elements in the dictionary may be identical) from some or all of the records created in step S115. In some embodiments, the structure of the dictionary compiled in step S120 may include a pair of items for each dictionary entry. In an embodiment, a dictionary may be organized similar to that illustrated in FIG. 3.

In FIG. 3, dictionary 300 may include multiple entries that each include a data element 310 (a word, phrase, sentence, quantitative data or other class of data from the database records) and a code 315. Code 315 may also be referred to as an index. In some embodiments, dictionary 300 may include categorized groups. For example, dictionary 300 may include, but are not limited to, entries for location 320, tags 325, company/organization 330, salary 335, and title 340. In an embodiment, dictionary 300 may contain D entries, where D is the total number of entries in dictionary 300.

Returning again to FIG. 1, in step S125, process 100 may create a set of training input/output pairs, stored in a memory or other storage device (computer readable storage medium), from the records compiled in step S115. The training input/output pairs may comprise some or all permutations of all of the code entries within each record. In an embodiment, a set of training input/output pairs may be organized similar to that illustrated in FIG. 4.

In FIG. 4, set of training input/output pairs 400 may include multiple entries that each include an input code 410 and an output code 415. In an embodiment, as illustrated in FIG. 4, a first group 420 may include an input code shown as "204" with output codes drawn from each of the other codes in the same record. A second group 425 may include an input code shown as "2050" with output codes drawn from each of the other codes in the record. Subsequent entries (not shown) may include groups representing additional codes from the specific record as an input code with some or all permutations of other codes in the same record as well as similar groups drawn from additional records in a database. In an embodiment, a set of training input/output pairs 400 may include all permutations of the codes for each record of a database. For example, if a database includes 100 records, and all of the records in the database have nine fields (similar to that shown in FIG. 2, for example), then the total number of entries N in the set of training input/output pairs 400 would be given by equation (1).

$$N=100*P(9,2)=100*72=7200 \quad (1)$$

Where P(9,2) represents the number of permutations of nine items taken 2 at a time. P(n,k) may be computed using the well-known equation given by equation (2).

$$P(n, k) = \frac{n!}{(n-k)!} \quad (2)$$

Of course records may include any number of fields and a database may contain an arbitrary number of records.

Returning again to FIG. 1, in step S130, process 100 may compute data element embeddings using the set of training input/output pairs created in step S125. In an embodiment, data element embeddings may be computed using an artificial neural network. In some embodiments, the training input/output pairs may be randomized (reordered into a random order) to improve the training efficiency of an artificial neural network. In an embodiment, an artificial neural network like that illustrated in FIG. 5 may be used to compute data element embeddings.

Figure 5:
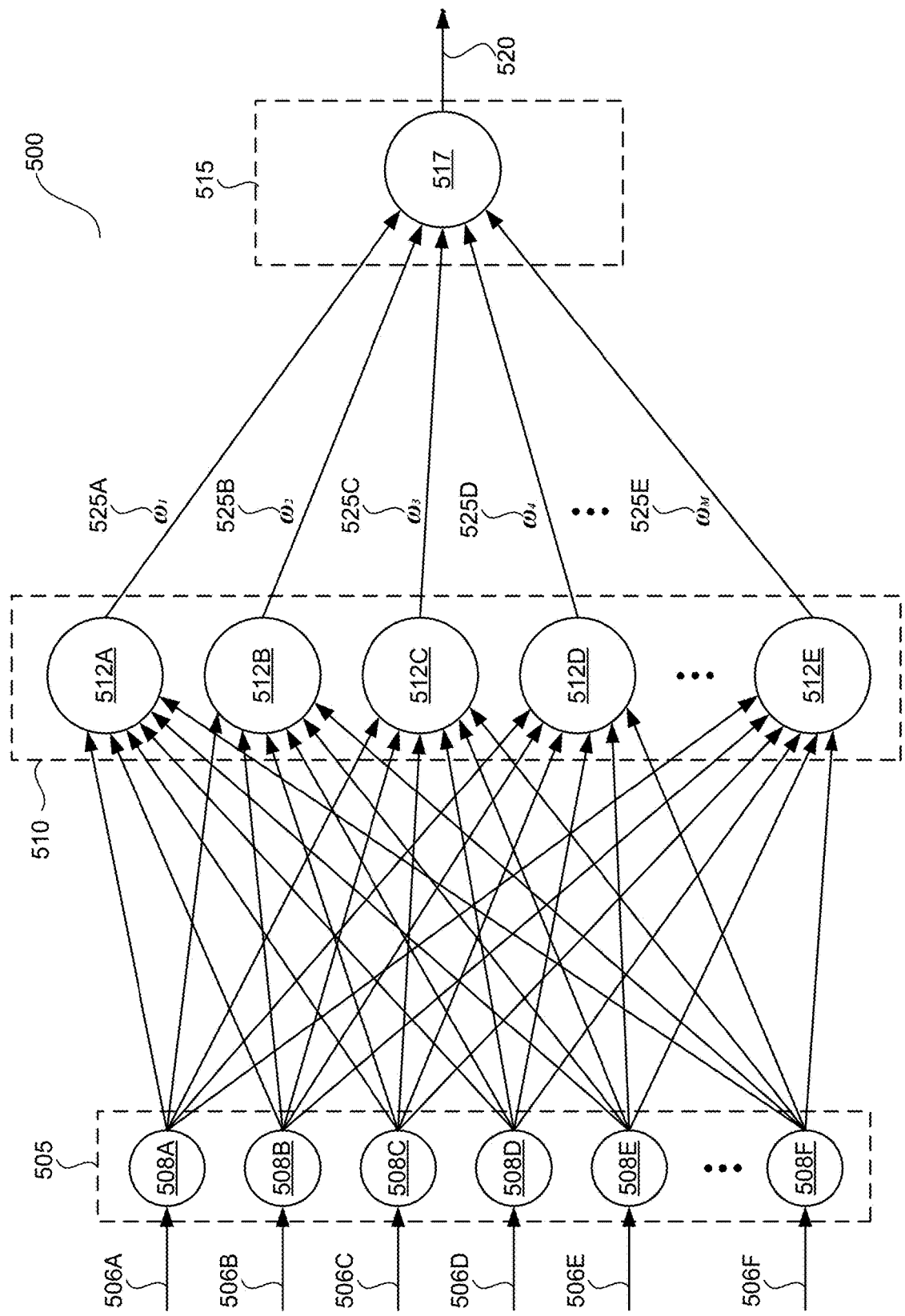
FIG. 5 is a block diagram showing a neural network according to an embodiment of the present disclosure.

In FIG. 5, artificial neural network 500 includes an input layer 505, a hidden layer 510, and an output layer 515. For simplicity, input layer 505 as illustrated in FIG. 5 shows only six input nodes 508A-508F with an ellipsis. The actual number of nodes in input layer 505 may be selected, for example, to match the number of entries in a dictionary or vocabulary. In an embodiment, the number of actual input nodes in input layer 505 may equal the number of entries D in dictionary 300 (shown in FIG. 3). Hidden layer 510 is also shown in simplified form, with five neurons 521A-512E and an ellipsis. The actual number of neurons in hidden layer 510 may be selected based on the number of desired dimensions of the embedding, which, in turn, may be determined empirically based on complexity and size of the dictionary. In some embodiments, the number of dimensions may be in the range of 50 to 1000.

In some embodiments, each neuron in hidden layer 510 receives an input from all of the input nodes in input layer 505. Neuron in hidden layer 510 may each sum the inputs received from input layer 505 and, in some embodiments, process the sums through a so-called "nonlinear activation function." The activation function, in an embodiment, may be the well-known "Softmax" function, or a similar sigmoid or logistic function. The outputs from hidden layer 510 may, in some embodiments, be weighted by weights $\omega_1$-$\omega_M$ (525A-525E) before being summed by output node 517 in output layer 515.

In an embodiment, artificial neural network 500 may operate in a training mode in the following manner: first, an input code 410 for each of the training pairs 400 (FIG. 4) may be presented at input layer 505. In an embodiment, an input code is presented to input layer 505 by constructing a so-called "one-hot" vector, where all of the inputs to input layer 505 are "0" except for the input node corresponding to the input code 410, which may be set to "1." For example, if the input code 410 is "3," then input node 508C may receive a "1" and all other input nodes receive a "0." For each input code presented to input layer 505, the set of weights 525 may be adjusted to minimize an error between the output 520 and the corresponding output code from the training pairs 400. In some embodiments, each weight 525 may be a real number.

After all of the entries in the training pairs 400 are presented to artificial neural network 500, and the weights have been adjusted for each presented training pair, a weight matrix may be formed that contains a row of real numbers for each entry in dictionary 300. Each of these rows may be extracted as a distributed representation vector (sometimes referred to as a "word vector") for the associated dictionary entry. Each distributed representation vector has dimension M, which is the number of neurons 512 in the hidden layer 510 of artificial neural network 500.

Figure 6:
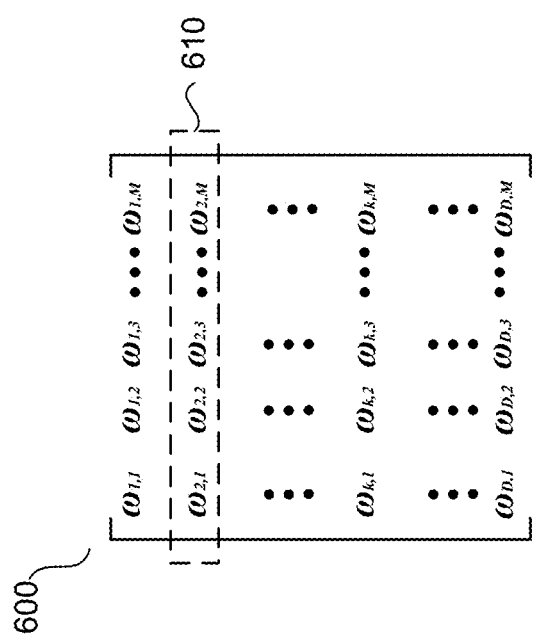
FIG. 6 is an illustration of an example weight matrix according to an embodiment of the present disclosure.

FIG. 6 illustrates an example weight matrix 600. Weight matrix 600 includes D rows, each row representing the weights ($\omega$) computed for each data element in dictionary 300 (FIG. 3). For example, row 610 represents the M weights computed for the second data element in dictionary 300.

Figure 7:
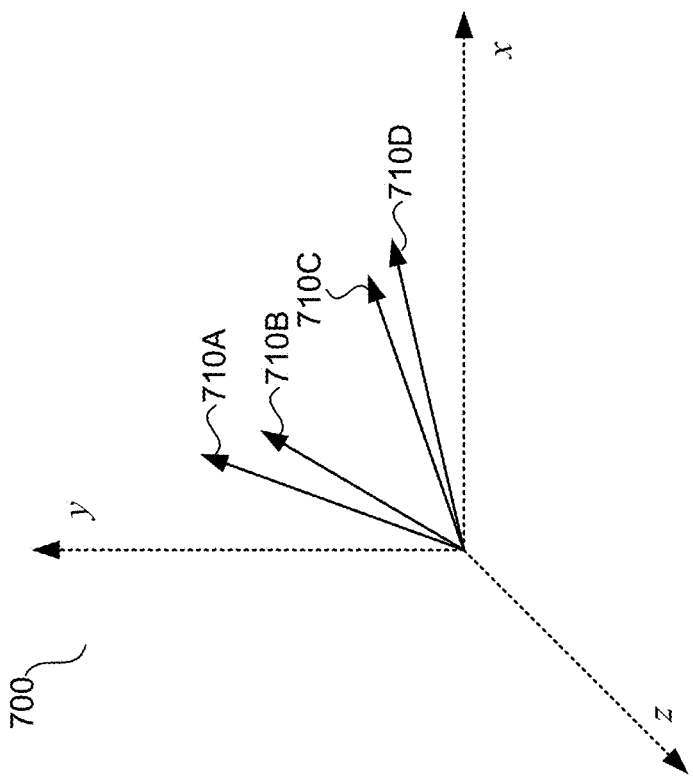
FIG. 7 illustrates a simplified vector space view according to an embodiment of the present disclosure.

FIG. 7 illustrates a simplified vector space view of several distributed representation vectors, as may be computed during training of artificial neural network 500. Vector space 700 (shown as three dimensions—i.e., M=3—for ease of understanding) includes four distributed representation vectors 710A-710D. In some embodiments, as a result of the training described above using training pairs 400, distributed representation vectors 710A and 710B may be found to be in relative proximity to one another. And distributed representation vectors 710C and 710C may also be found to be in relative proximity to one another.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C#, SQL, MySQL, or similar programming languages. The computer readable program instructions may execute entirely on a user's personal computer, notebook computer, tablet, or smartphone, entirely on a remote computer or compute server, or any combination of these computing devices. The remote computer or compute server may be connected to the user's device or devices through a smart computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Figure 8:
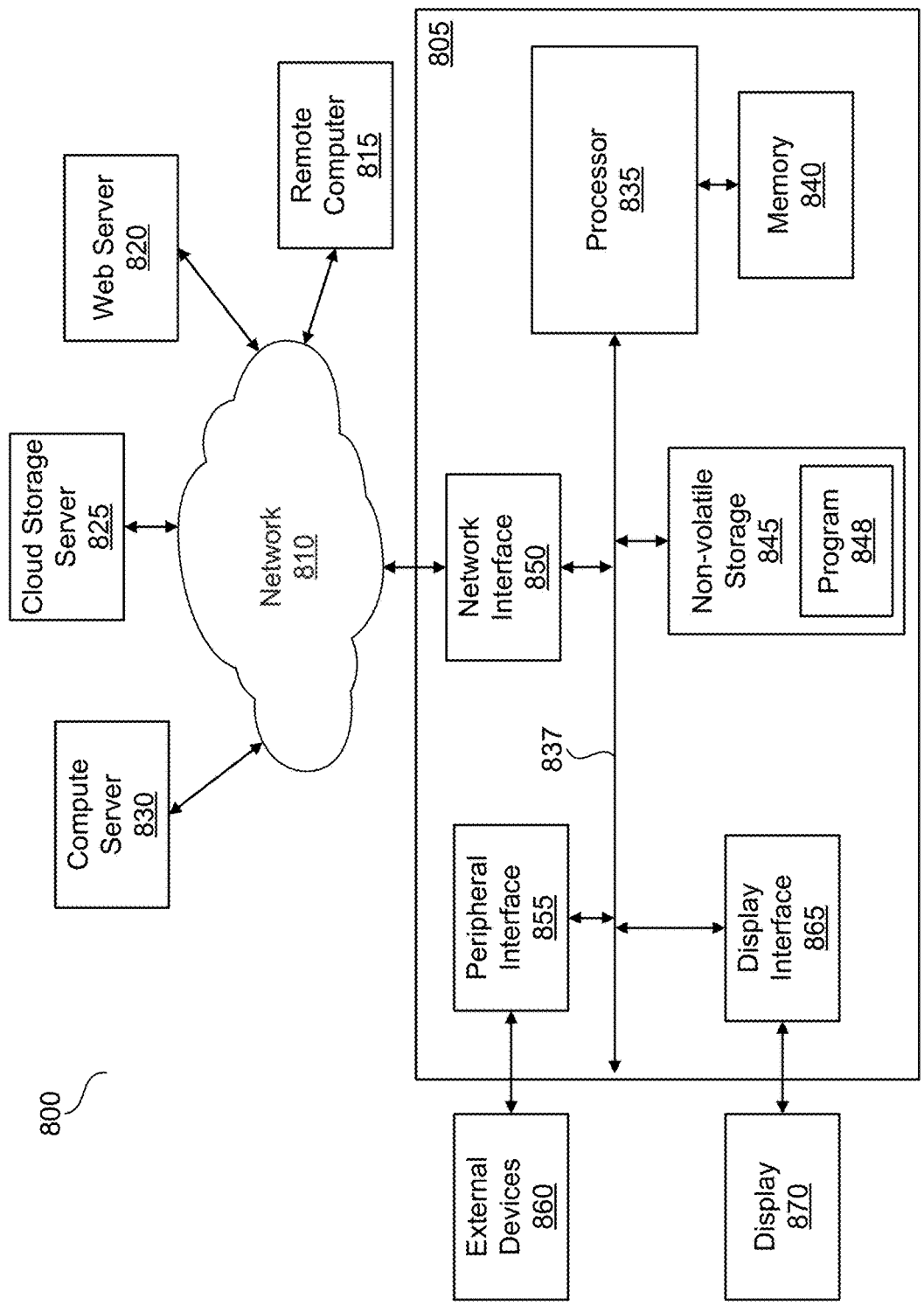
FIG. 8 is a functional block diagram illustrating a networked system according to an embodiment of the present disclosure.

FIG. 8 is a functional block diagram illustrating a networked system 800 of one or more networked computers and servers. In an embodiment, the hardware and software environment illustrated in FIG. 8 may provide an exemplary platform for implementation of the software and/or methods according to the present disclosure.

Referring to FIG. 8, a networked system 800 may include, but is not limited to, computer 805, network 810, remote computer 815, web server 820, cloud storage server 825 and compute server 830. In some embodiments, multiple instances of one or more of the functional blocks illustrated in FIG. 8 may be employed.

Additional detail of computer 805 is shown in FIG. 8. The functional blocks illustrated within computer 805 are provided only to establish exemplary functionality and are not intend to be exhaustive. And while details are not provided for remote computer 815, web server 820, cloud storage server 825 and compute server 830, these other computers and devices may include similar functionality to that shown for computer 805.

Computer 805 may be a personal computer (PC), a desktop computer, laptop computer, tablet computer, netbook computer, a personal digital assistant (PDA), a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; and Cortex-A, Cortex-R and Cortex-M from Arm.

Bus 837 may be a proprietary or industry standard high-speed parallel or serial peripheral interconnect bus, such as ISA, PCI, PCI Express (PCI-e), AGP, and the like.

Memory 840 and non-volatile storage 845 may be computer-readable storage media. Memory 840 may include any suitable volatile storage devices such as Dynamic Random Access Memory (DRAM) and Static Random Access Memory (SRAM). Non-volatile storage 845 may include one or more of the following: flexible disk, hard disk, solid-state drive (SSD), read-only memory (ROM), erasable programmable read-only memory (EPROM or Flash), compact disc (CD or CD-ROM), digital versatile disk (DVD) and memory card or stick.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 ay be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and compute server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, loud storage server 825 and compute server 830.

FIGS. 9-14 illustrate aspects of a simplified example of an embodiment of the present disclosure. In this example, a single item of natural language text and data (a job posting) is used as the basis for the generation of a set of distributed representation vectors (data element embedding). In the example, the item of natural language text and data produces a record with 16 fields. A simplified dictionary is then generated based on these 16 fields. The dictionary is used to produce training pairs that may then, after randomization, be used to train a simplified artificial neural network to generate the set of distributed representation vectors, each having a dimensionality of four. As discussed above, an actual implementation may generate distributed representation vectors having dimensionality, for example, in the range of 50 to 1000.

Figure 9:
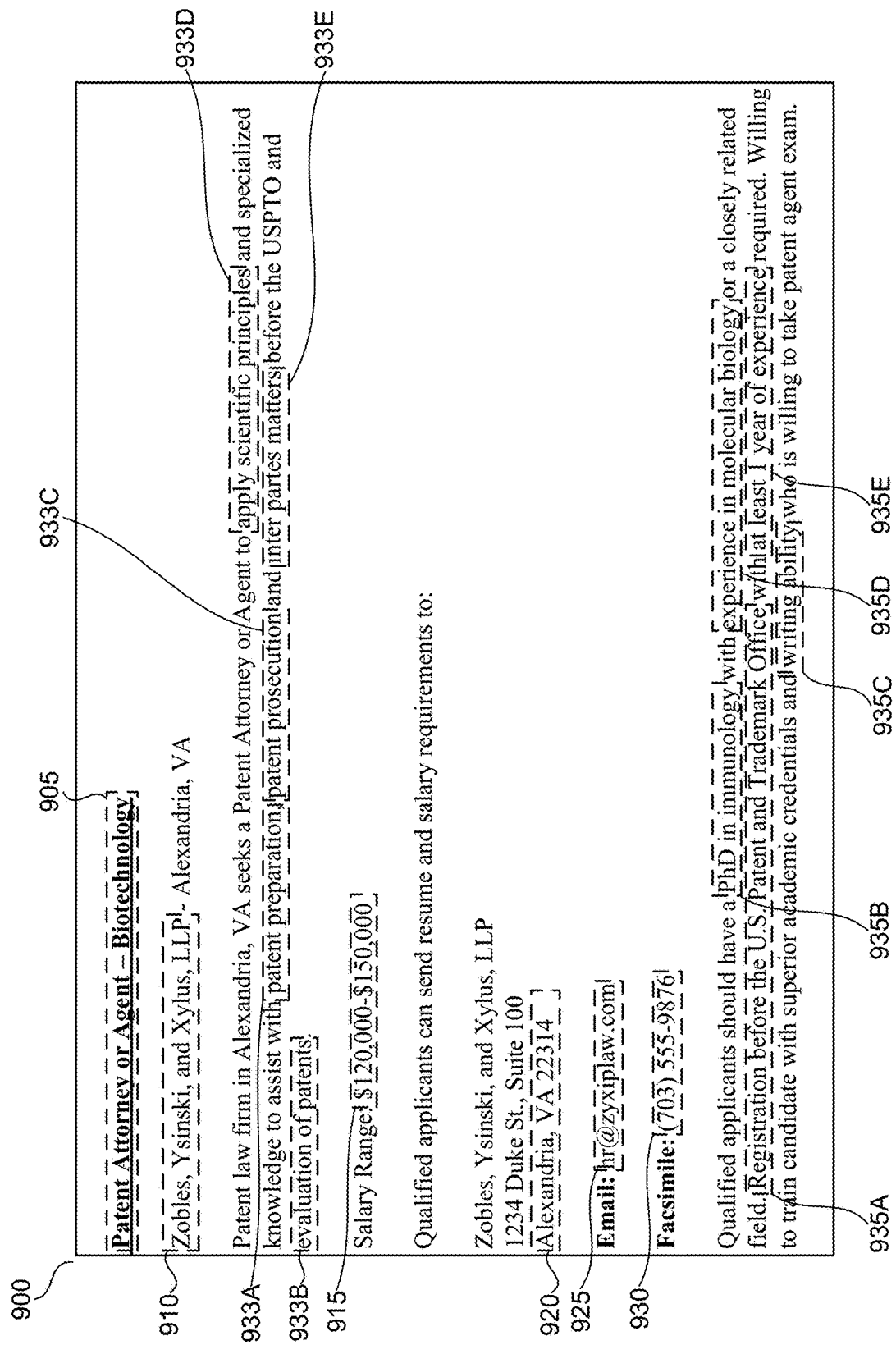
FIG. 9 is an illustration of an example item of natural language text according to an embodiment of the present disclosure.

FIG. 9 illustrates an example item of natural language text, quantitative data, and other data classes (a job posting) that may be one of many such items of a source dataset in an exemplary embodiment of the present disclosure. From the job posting 900, various data fields may be extracted (as described above with reference to step S110 in FIG. 1). For example, job title 905, company/organization name 910, salary range 915, job location 920, and additional fields, such as contact email 925, contact Fax number 930, job description 933A-933E, required registration 935A, required education 935, and required experience 935C-935E.

FIG. 10 illustrates an example record 1000 that may have been populated from data extracted (data elements) from the example item of natural language text, quantitative data, and other data classes (job posting) illustrated in FIG. 9. Record 1000 may include fields 1005-1020 (each field represented by a row of the array shown in FIG. 10). In an embodiment, field 1005 may relate to the location of the posted job, field 1006 may relate to the company/organization name associated with the posted job, field 1007 may relate to the salary associated with the posted job, field 1008 may relate to the job title associated with the posted job, and fields 1009-1020 may relate to additional data (such as contact information, job descriptions and job requirements) associated with the posted job. Each of the fields 1005-1020 within record 1000 may also include subfields 1025-1028 (each subfield represented by a column of the array shown in FIG. 10). In an embodiment, fields 1005-1020 may include subfields that identify a job_id 1030, a code 1035, an element 1040, and a category 1045.

Figure 11:
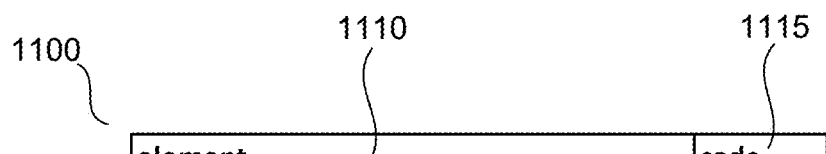
FIG. 11 is an illustration of another example dictionary according to an embodiment of the present disclosure.

The data in example record 1000 in FIG. 10 may be used to compile a dictionary like that illustrated in FIG. 11.

In FIG. 11, dictionary 1100 includes 16 entries that each include a data element 1110 (a word, phrase, sentence, quantitative data, or other classes of data from example record 1000 of FIG. 10) and a code 1115. In the simplified example embodiment illustrated in FIG. 11, dictionary 1100 contains 16 entries, and the codes are assigned sequentially from 1 to 16.

FIG. 12 illustrates a set of training input/output pairs 1200 based on the dictionary 1000 shown in FIG. 11. As described above with reference to FIG. 4, training input/output pairs 1200 may include multiple entries that each include an input code 1210 and an output code 1215. In an embodiment, as illustrated in FIG. 12, the set of training input/output pairs 1200 may include all permutations of the codes for each record (for this example, there is only a single record employed). In the example, with one records having 16 fields (shown in FIG. 10), then the total number of entries N in the set of training input/output pairs 1200 would be 240 based on the formula given by equation (1). Also shown in FIG. 12 is a set of randomized training input/output pairs 1220, generated by randomly reordering the entries in the set of training input/output pairs 1200. The purpose of this randomization, as discussed above with reference to step S130 in FIG. 1, is to improve the training efficiency of an artificial neural network.

Figure 13:
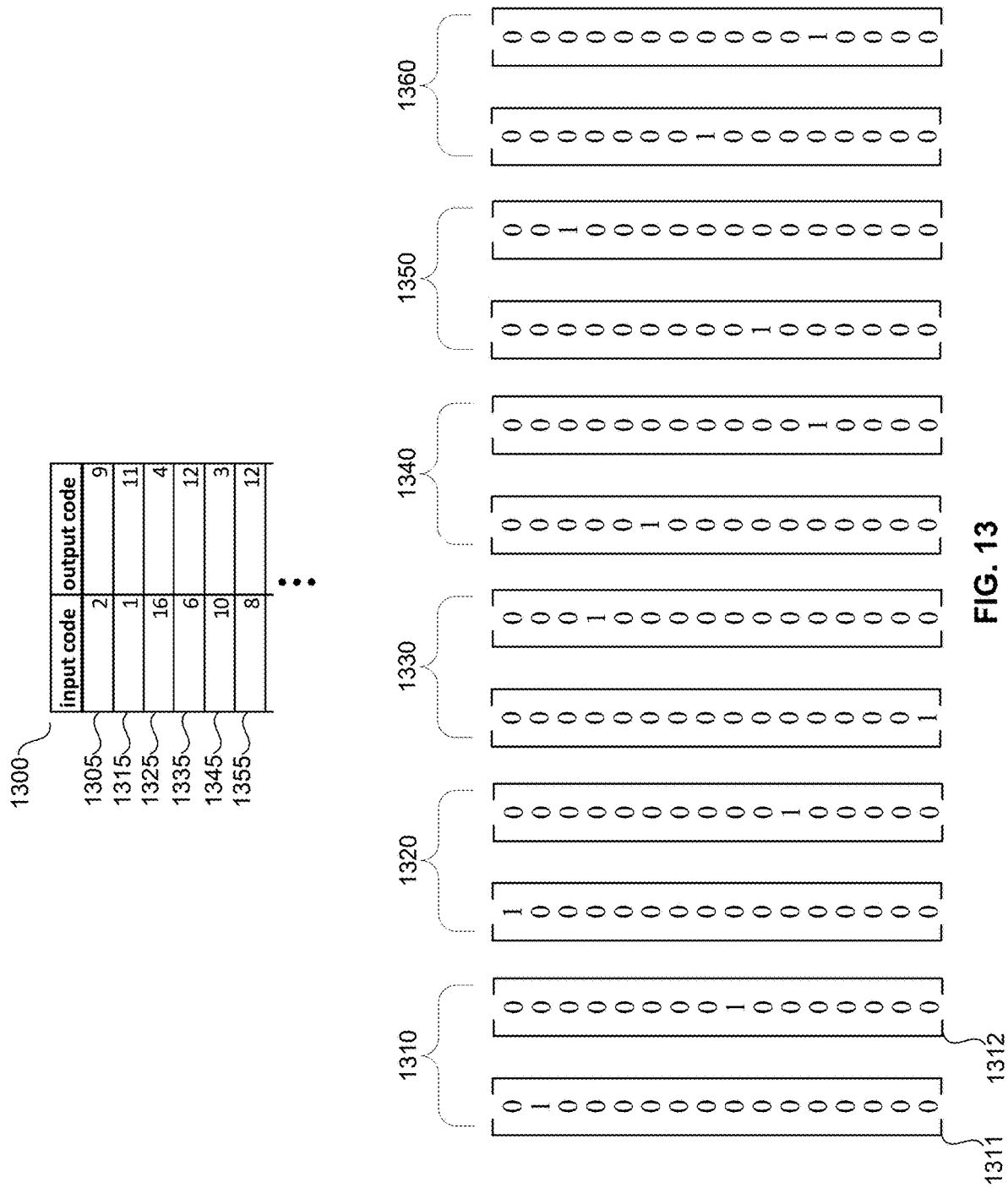
FIG. 13 is an illustration of an example of converting randomized training input/output into "one-hot" vectors.

FIG. 13 illustrates an example of converting randomized training input/output pairs 1300 into "one-hot" vectors used for training an artificial neural network. In FIG. 13, entry 1305 of randomized training input/output pairs 1300 may be converted to one-hot input/output pair 1310. As may be observed, the input code of entry 1305 ("2") is converted to one-hot input vector 1311, with a "1" in the second position and a "0" in every other position. Similarly, the output code of entry 1305 ("9") is converted to one-hot output vector 1312, with a "1" in the ninth position and a "0" in every other position. In a similar fashion, entries 1315-1315 are converted to one-hot input/output pairs 1320-1360. The remaining entries (not shown) in randomized training input/output pairs 1300 are also converted to one-hot input/output pairs.

The one-hot input/output pairs may then be used to train an artificial neural network like that shown in FIG. 5. For this example, the artificial neural network would have 16 input nodes and 4 hidden neurons. Each of the one-hot input vectors would be presented to the artificial neural network, and the network would adjust the appropriate weights (525A, etc.), using for example, back propagation and gradient descent optimization, to produce the corresponding one-hot output vectors.

After all of the 240 training pairs in this example embodiment, have been used to train the artificial neural network, a weight matrix 1400, illustrated in FIG. 14, may be produced. Weight matrix 1400 includes 16 rows, each row representing the distributed representation vector (group of weights) computed for each data element in dictionary 1100 (FIG. 11). For example, row 1410 represents the distributed representation vector computed for the fourth dictionary entry ("Patent Attorney or Agent—Biotechnology").

The use of the embodiments disclosed herein allow for improvements and enhancements to the traditional use of computers in the field of natural language processing of textual, quantitative, and other classes of. The distributed representation vectors generated by the disclosed embodiments allow for direct manipulation, comparison and association of complex terms (words, phrases, sentences, quantitative data, and other classes of data) by using vector arithmetic (addition, subtraction, etc.) and vector distance measures (dot product, cosine similarity, Euclidean distance, etc.). For example, these techniques may be used in the area of human resource management to produce better understanding of human capital trends and draw better insights about job skills, occupational trends, company value, and career paths. Additionally, these techniques may provide insights to companies, organizations, governments and individuals to better understand labor markets. Furthermore, the ability of the disclosed embodiments to represent quantitative data facilitates the derivation of quantitative formulae, distributions, functions, and the like, that have not previously been able to be modeled due to a heavy dependency on context. With the embodiments disclosed herein, it is possible, for example, to define a function for a job's salary where the independent variables are factors like company name, job location, job title and tags. Finally, by first parsing source data into component classes (e.g., company name, job location, job title, salary, tags), the disclosed embodiments allow relational representations to be discovered within each class (e.g., 'multi-task' is a synonym of 'multitask') and in combination (e.g., 'Blockchain Developer' at Company A equals 'Software Engineer'+'Blockchain' at Company B).

Those with skill in the art will also recognize that the embodiments disclosed herein allow for extremely efficient processing of scenarios that are necessarily defined across multiple classes (e.g. each scenario is defined having a company name, job title, job location, salary, and tags). For example, in many real-world applications, documents are often structured with multiple mandatory and optional classes of textual, quantitative, and other non-text data types (e.g., a job posting must have an identifying code, company name, job title, description, experience requirements, location, and may include salary, benefits, education requirements, certification requirements, contact information, marketing content, code snippets, other meta-data, etc.), so analyzing relationships between and among scenarios (e.g., jobs or any combination of component classes) must address these classes of information. The embodiments disclosed herein allow for processing of substantially more complex problems than traditional Natural Language Processing systems with no increase in computation or memory requirements. These embodiments may also be viewed as reducing the complexity for multiple class scenarios to be equal to the complexity of single class scenarios, or substantially reducing complexity of 1:1 mapping approaches to close to zero. Mapping complexity is therefore, using the disclosed embodiments, independent of the number of classes being represented.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Obviously, numerous modifications and variations of the present invention are possible in light of the above teachings. It is therefore to be understood that within the scope of the appended claims, the invention may be practiced otherwise than as specifically described herein.

The invention claimed is:

1. A method for generation, by a processor, of a set of distributed representation vectors, the method comprising:
   receiving, by the processor, a dataset, wherein the dataset comprises a set of related items of at least one of natural language text and non-text data;
   parsing, by the processor, the dataset to identify known classes of data;
   extracting data elements from the dataset based on the known classes of data;
   organizing the extracted data elements into one or more records;

compiling, by the processor, a dictionary of unique data elements and associated codes from the one or more records;

creating a set of training data using permutations of the associated codes that correspond to extracted data elements within each of the one or more records record; and computing, by the processor, a distributed representation vector for each of the unique data elements in the dictionary using the set of training data, wherein:

each of the related items is for a job position, the known classes of data include an organization name and a job title, and the computing the distributed representation vector uses an artificial neural network with one hidden layer, wherein a set of weights computed in the hidden layer form the distributed representation vector.

2. The method of claim 1, wherein the known classes of data further include a job location, a salary, and a job description.

3. The method of claim 1, further comprising:

cleaning the dataset prior to parsing, wherein cleaning the dataset additionally comprises one or more of: removing extraneous data, removing irrelevant data, removing inaccurate data, correcting corrupt data and correcting inaccurate data in the dataset.

4. The method of claim 1, wherein creating the set of training data uses all possible permutations of codes that correspond to data elements within each record.

5. A computer program product for generating a set of distributed representation vectors of a dataset of at least one of natural language text and non-text data, the computer program product comprising a non-transitory computer readable storage medium having stored thereon program instructions which, when executed by one or more processors, cause the one or more processors to:

receive a dataset, wherein the dataset comprises a set of related items of at least one of natural language text and non-text data;

parse the dataset to identify known classes of data;

extract data elements from the dataset based on the known classes of data;

organize the extracted data elements into records;

compile a dictionary of unique data elements and associated codes from one or more of the records;

create a set of training data using permutations of the associated codes that correspond to extracted data elements within each of the one or more records record; and compute a distributed representation vector for each of the unique data elements in the dictionary using the set of training data, wherein:

each of the related items is for a job position, the known classes of data include an organization name and a job title, and the program instructions that cause the one or more processors to compute the distributed representation vector additionally comprise program instructions that cause the one or more processors to use an artificial neural network with one hidden layer, wherein a set of weights computed in the hidden layer form the distributed representation vector.

6. The computer program product of claim 5, wherein the known classes of data further include a job location, a salary, and a job description.

7. The computer program product of claim 5, wherein the program instructions further cause the one or more processors to clean the dataset, prior to parsing, and wherein the program instructions that cause the one or more processors to clean the dataset, additionally comprise program instructions that cause the one or more processors to remove one or more of: extraneous data, irrelevant data, inaccurate data, corrupt data and inaccurate data from the dataset.

8. The computer program product of claim 5, wherein the program instructions that cause the one or more processors to create a set of training data use all possible permutations of codes that correspond to data elements within each record.

9. A computer system for generating a set of distributed representation vectors of a dataset of at least one of natural language text and non-text data, the computer system comprising:

one or more processors; and a computer readable storage medium, wherein the one or more processors is configured to execute program instructions stored on the computer readable storage medium and the program instructions include:

program instructions to receive a dataset, wherein the dataset comprises a set of related items of at least one of natural language text and non-text data;

program instructions to parse the dataset to identify known classes of data; program instructions to extract data elements from the dataset based on the known classes of data;

program instructions to organize the extracted data elements into records;

program instructions to compile a dictionary of unique data elements and associated codes from one or more of the records;

program instructions to create a set of training data using permutations of the associated codes that correspond to extracted data elements within each of the one or more records record; and program instructions to compute a distributed representation vector for each of the unique data elements in the dictionary using the set of training data, wherein:

each of the related items is for a job position, the known classes of data include an organization name and a job title, and the program instructions to compute the distributed representation vector additionally comprise program instructions to use an artificial neural network with one hidden layer, wherein a set of weights computed in the hidden layer form the distributed representation vector.

10. The computer system of claim 9, wherein the known classes of data further include a job location, a salary, and a job description.

11. The computer system of claim 9, wherein the program instructions further cause the one or more processors to clean the dataset, prior to parsing, and the program instructions to clean the received dataset, additionally comprise program instructions to remove one or more of: extraneous data, irrelevant data, inaccurate data, non-data data, corrupt data and inaccurate data from the dataset.

12. The computer system of claim 9, wherein the program instructions to create a set of training data use all possible permutations of codes that correspond to data elements within each record.

* * * * *